United States Patent Office 3,306,502
Patented Feb. 28, 1967

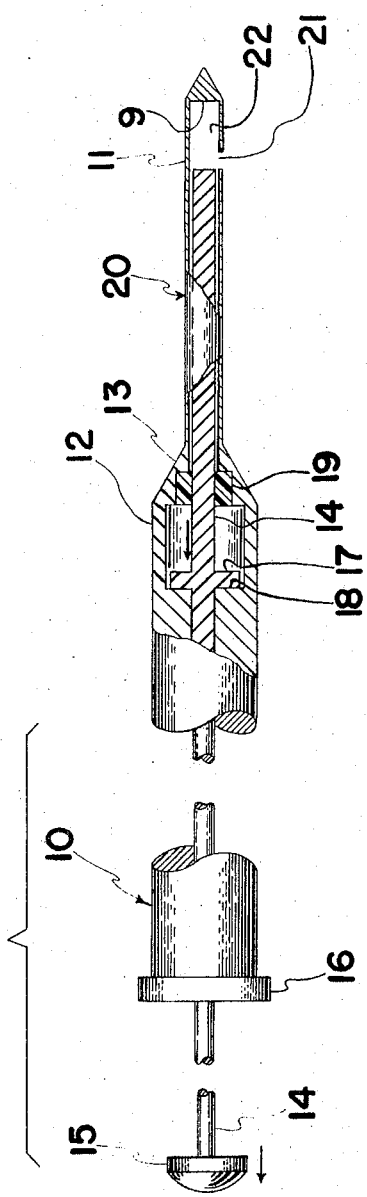
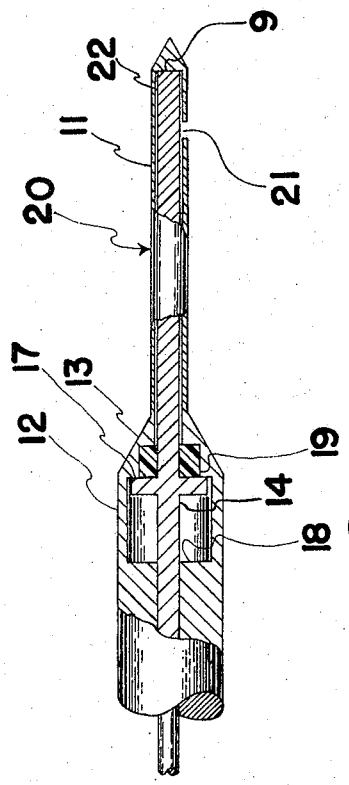

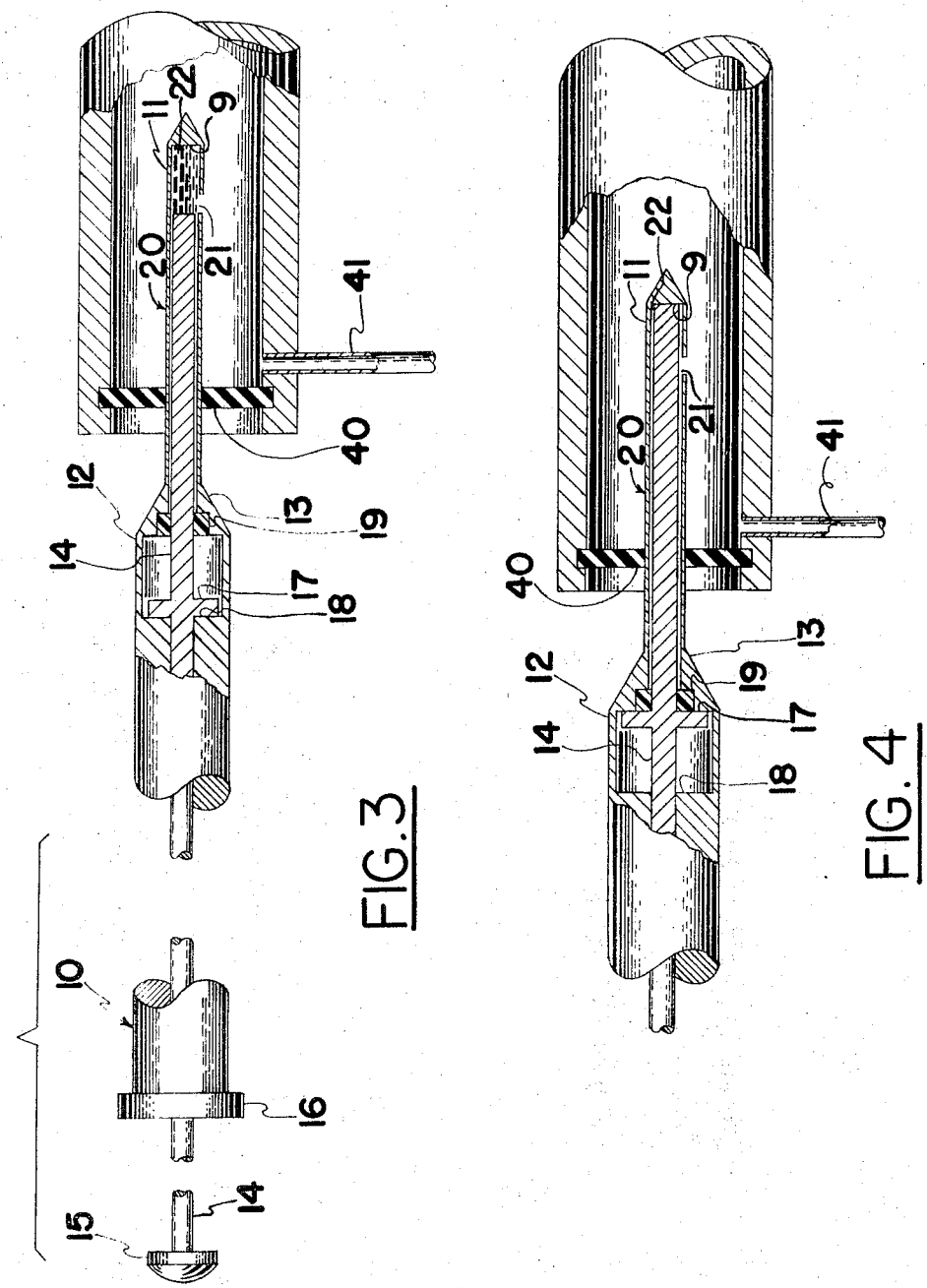

3,306,502
APPARATUS FOR INJECTION OF FLUIDS
Rano Joseph Harris, Jr., Baton Rouge, La., assignor to Precision Sampling Corporation, Baton Rouge, La., a corporation of Louisiana
Filed Apr. 28, 1965, Ser. No. 451,521
4 Claims. (Cl. 222—386)

This invention relates to the art of dispensing fluids, especially to apparatus for dispensing relatively small, accurately measured quantities of fluids. In particular, it relates to precision injection apparatus or syringes for dispensing micro-quantities of fluids, especially liquids, into various systems.

The prior art is replete with various forms of apparatus for dispensing fluids, one of the better known of which is the needle syringe; most often referred to merely as a syringe.

The syringe consists, in general, of a barrel, i.e. a tubular member, upon an end of which is mounted a relatively thin hollow needle. The openings of the needle and barrel are axially aligned and communicated one with the other, and at the terminal end of the needle there is provided an opening for withdrawing and dispensing fluids. At the opposite end of the barrel is fitted a mating plunger slidable at least the length of the barrel and, often the plunger is slidable within the needle itself. The latter feature is prevalent, if not entirely limited to, later forms of apparatus, and its purpose is to provide greater accuracy in dispensing or injecting micro-quantities of fluids into a system e.g. a chromatograph, chemical system, living tissues or the like.

In earlier forms of syringe, the inner diameter of the barrel with its mating plunger is very large as contrasted with the relatively small inside diameter of the needle opening. This relationship does not provide for accuracy or precision of measurement. In the later, more sophisticated forms of syringe—i.e. those wherein the plunger (or an extension thereof) is slidable within the needle—the inside diameters of barrel and needle openings, and as well the size of the plunger, more closely apparoach one another. In the very latest devices, to provide greatest accuracy and precision of measurement, the fluid to be dispensed is contained entirely within the needle opening wherefrom it is positively expelled by positive action of the slidable plunger.

In the use of such syringes, fluids, especially liquids, are withdrawn through the needle opening at the terminal end of the needle as the plunger is retracted. In filling the earlier devices—i.e. those wherein the plunger does not extend into the needle—air inside the needle is sucked up with the liquid. This produces considerable error. Considerable inaccuracy is also produced by loss of liquid which wets the annulus between the plunger and the wall of the barrel. In dispensing liquid from the syringe, relatively short forward movement of the plunger ejects large volumes of liquid from the barrel through the dispensing end of the needle. These characteristics obviously do not provide the accuracy and precision required for dispensing micro quantities of liquids.

The later devices—i.e. those wherein the plunger extends into the needle opening—overcome this prior art deficiency to some extent since there is relatively little air contained within the needle opening and hence relatively little air is withdrawn therefrom into the barrel. Moreover, forward movement of the plunger dispenses small volumes of liquid for relatively large plunger movements.

Despite these improvements, however, even the very latest syringes have severe shortcomings which interfere with their accuracy and precision in dispensing fluids. A major deficiency yet relates to inaccuracies caused by the air contained within the annular space between the outer diameter of the plunger and the wall which houses the plunger, i.e. the annular space between the plunger and the inside wall of the needle. As the plunger is retracted, an annulus of air remains behind and within the needle to displace liquid which would normally fill the openings thereof. While the volume of air is quite small, it nonetheless introduces significant error, and therefore presents great difficulty where the concern involves dispensing accurately measured micro-quantities of liquid with high precision.

In such injections seepage of the fluid to be dispensed into the annulus is also a cause of error. This is particularly true in high pressure injections wherein the error caused by seepage of fluid into the annulus is particularly manifest. When e.g. the needle containing a fluid to be dispensed is thrust into the septum of a chromatograph a pressure is exerted upon the fluid because of the differential pressure between atmospheric and the higher operating pressure manifested within the septum. The fluid is forced into the annulus around the plunger, thus causing error.

Because of these and other reasons, an acute need exists for accurate fluid dispensing devices, especially those capable of consistently delivering relatively small, accurately measured quantities of fluids, especially micro-quantities of liquid, into various systems.

It is the primary objective of the present invention to fulfill this need and to advance the state of the art by providing apparatus for overcoming these and other problems. In particular, it is an object to provide a new and improved syringe capable of receiving, measuring, and delivering accurately measured quantities, especially micro-quantities, of fluids, especially liquids, into various systems, e.g., analytical measuring instruments, chemical systems, tissues, and the like. A particularly desirable objective is to provide apparatus especially useful for high pressure injections. More particularly, it is an object to provide such new and improved syringe of simple construction and design, and yet capable of extreme accuracy and precision.

These and other objects are achieved in accordance with the present invention which contemplates a structure including, generally, a tubular member or barrel upon an end of which is fitted a side perforated hollow or tubular needle. The needle is hollow in that it is provided with an internal passage, passageway or opening through the central axis of needle. The opening begins at the location wherein it opens into the barrel and continues through the needle on beyond the location of the side perforation, finally terminating at a closed end or wall. The upstream portion of the internal opening communicates the barrel and the side perforation for ingress and egress of fluids. The portion of the internal opening which terminates downstream of the side vent opening provides a reservoir for containing accurately measured volumes of fluids.

At the opposite end of the barrel is provided a mating plunger which extends into and is movable within the internal opening through the needle. The movement of the plunger is sufficient to traverse the distance from the closed end of the needle and the side perforation to withdraw fluids into the reservoir and to dispense fluids therefrom.

A novel feature of the apparatus resides in the combination which includes the plunger, side perforation and reservoir. By placing the needle in a source of fluid to be dispensed the needle can be retracted to permit flow of fluid through the side perforation to fill the reservoir. On the other hand, downward movement of the plunger into the reservoir displaces the fluid and positively ejects the fluid through the side perforation.

The invention will be better understood by reference to the following detailed description of a specific and preferred embodiment and to the attached drawings which, with the description, brings out the salient features of the invention.

In the drawings:

FIGURE 1 is a simplified partial half-section view of preferred apparatus, showing the plunger thereof in retracted position with the side perforation of the needle in open position for receiving fluid into the needle.

FIGURE 2 is a fragmentary half-section view showing the same apparatus with the plunger thereof in forward position for displacement and ejection of fluid from the needle portion of the apparatus, FIGURE 3 is a fragmentary half-section view of the apparatus containing the desired amount of fluid for dispensing. In the figure, is shown, by schematic representation, a septum of a chromatograph, and the needle portion of the apparatus is shown projected into the septum, and FIGURE 4 is a fragmentary view showing the condition of the apparatus in injecting fluid into the septum.

Referring to FIGURE 1 is shown a syringe 10, the dispensing end 20 of which is fitted with a tubular needle 11. For sake of simplicity, the needle 11 is shown fitted upon a barrel 12 by rigid attachment to a tapered end wall 13, though a more practical apparatus would involve attachment or placement of the needle upon the barrel via a hub or collar arrangement (not shown). At the opposite end of barrel 12 and extending therein is provided a plunger 14 mounted via a shoulder 16 within barrel 12. The plunger 14 extends into the internal opening of the needle 11. Movement of plunger 14 within the internal opening of needle 11 is effected by withdrawal or forward movement by action upon plunger handle 15.

The plunger 14 is provided with a projecting surface or stop 17 which limits the distance which plunger 14 can be retracted. Thus upon retraction stop 17 of plunger 14 comes into contact with shoulder 18 and can move no further. In this position it will be noted that the forward end of plunger 14 extends slightly forward, or slightly upstream, of an annular packing 19 but insufficiently far enough to block the perforated side opening 21 of needle 11. In normal operation retraction of plunger 14 in this manner permits ingress of fluid through perforated opening 21.

It will be observed that the internal opening within needle 11 forward of perforated opening 21 provides a reservoir 22. Thus the forward end of needle 11 is closed by end wall 9 or other closure member. The volume of reservoir 22 is calibrated to deliver a desired quantity of fluid as will be later explained.

In FIGURE 2 plunger 14 is projected forward to its full extent, and into reservoir 22. Forward movement of plunger 14 is sufficient to permit maximum displacement of the volume constituting reservoir 22. In its movement into such position plunger 14 positively displaces fluid from reservoir 22. The fluid flows around the annulus of plunger 14 and egresses from needle 11 via perforation 21.

In operation, the dispensing end 20 of the syringe can be placed e.g., in a supply of liquid which is to be dispensed. Thus, withdrawal or retraction of the forward end of plunger 14 from reservoir 22 is effected by pulling handle 15 outward to its extreme position. The position of plunger 14 so withdrawn is as shown by reference to FIGURE 1. In such position, liquid flows into reservoir 22 via perforated opening 21. To purge air from the reservoir plunger 14 is again forced forward by downward movement of handle 15, and fluid and air exits via the opening 21. The cycle is repeated until the inside wall of needle 11 and forward portion of plunger 14 are thoroughly wetted by the fluid. The plunger 14 is then pushed forward slightly to barely close perforated opening 21. In this position the apparatus is ready to dispense the fluid now contained in reservoir 22. Needle 11 can now be removed from the supply source of fluid and readied for injection of the fluid into a system.

The structure which includes the plunger 14, side perforation 21 and reservoir 22 constitutes a key and novel feature, particularly of the overall apparatus combination. The function and coaction of these members, one upon the other, will be particularly discussed in the following description of that portion of the operating cycle wherein fluid is dispensed into a system which is at a pressure greater than atmospheric e.g., into a chromatograph. As heretofore mentioned the apparatus is particularly suitable for delivery of measured volumes of fluid to a chromatograph and this specific operation shall be specifically described by reference to FIGURES 3 and 4.

To dispense the meausred quantity of liquid from reservoir 22, needle 11 of the apparatus is pushed into the septum of a chromatograph as shown by reference to FIGURE 3. In the operation of the chromatograph e.g., a pressure of fifty pounds per square inch gauge (p.s.i.g.) is generated within septum 40 by introduction of carrier gas through side vent opening 41. The carrier gas tends to enter the perforated opening 21 of needle 11 thus exerting pressure on the volume of fluid within needle 11, including, of course, the volume of fluid contained within reservoir 22. It is to be observed, however, that because of the location of the perforated opening there is no adverse effect of pressure upon the fluid contained within reservoir 22. Fluid within reservoir 22 remains within the reservoir 22 and is held there by the pressure. It does not flow or even tend to flow into the annulus of plunger 14. There are in effect two force vectors created, one directed toward the annulus of plunger 14 and the other toward reservoir 22. That directed toward reservoir 22, however, exerts a positive influence in containing fluid within the reservoir 22. Since the fluid to be injected is that which is contained in reservoir 22 there is no problem of seepage of fluid around the annulus. This is significant, and even the seal 19 need be of no special construction in order to retain fluid since the fluid to be dispensed is isolated in reservoir 22. In fact, if desired, bleeding through seal 19 can even be permitted, since this will have no effect upon the fluid within reservoir 22.

To dispense the fluid from reservoir 22 into the chromatograph plunger 14 is pressed all the way forward as shown by reference to FIGURE 4. The liquid then egresses around the annulus of plunger 14 via perforated opening 21 and is conveyed into the instrument via the carrier gas.

In ejection of the fluid, the fluid ejected is that displaced from reservoir 22 by projection therein of plunger 14. The more closely the portion of plunger 14 projected into reservoir 22 displaces the volume thereof the more closely the ejected volume of fluid will approach that originally contained in the reservoir 22. Even this small error, however, can be largely overcome when fluid is injected into a heated zone.

Upon completion of this stroke the plunger 14 is withdrawn to open perforation 21 as shown by reference to FIGURE 3. In a heated zone, the liquid remaining in reservoir 22 is vaporized and fills said reservoir 22. Downward movement of plunger 14 a second time positively displaces essentially all of the vapor except that remaining in the annulus between the plunger 14 and the walls of reservoir 22. Operation of the apparatus in such manner assures high precision dispensing of the measured volumes of liquid. Removal of needle 11 from septum 40 completes the cycle.

The apparatus of this invention can be made of essentially any of the normal materials of construction. The barrel can be made of plastic, glass, metals and the like. The plunger likewise can be made of any convenient material, but generally metals such as iron, steel, brass, or the like are preferred. The needle can also be made of convenient materials, especially metals such as those mentioned. Preferably however it is made of steel. The seal can be made of conventional materials or plastics, e.g., nylon impregnated fiber and the like. Teflon (polytetrafluoroethylene) has been found a very suitable material because of its ability to fit tightly to form a good seal and also because of its high quality of inertness to liquids and gases.

It is apparent that the invention is susceptible to some changes and modifications without departing the spirit and scope thereof.

Having described the invention what is claimed is:

1. In combination, apparatus comprising a hollow needle open from one end forward through its central axis to provide an axial opening, but being closed at its opposite extremity, a side perforated opening in the needle wall located at a distance away from the closed end of the needle, a wall portion in the needle located between the closed terminal end and the side perforated opening to define a reservoir, and a mating plunger reciprocable within said reservoir.

2. The apparatus of claim 1 wherein the open end of the needle is provided with an annular seal through which the plunger can be projected.

3. In a fluid injection apparatus which includes a barrel and a hollow needle fitted upon an end thereof, said barrel and needle containing contiguous openings axially aligned one with the other, and a mating plunger fitted at the opposite end of the barrel, extending into and movable within the needle opening, the improvement comprising a closure member which blocks the terminal end of the needle, a side perforated opening in the needle wall located at a distance away from the closed end of the needle, a wall portion in the needle located between the closed terminal end and the side perforated opening to define a reservoir for containing fluid, which fluid can be dispensed through the perforated opening via positive displacement of the fluid by movement of the plunger into the reservoir.

4. The apparatus of claim 3 wherein the portion of the needle which opens into the barrel is provided with an annular seal through which the plunger can be projected.

References Cited by the Examiner

UNITED STATES PATENTS

| 1,731,635 | 10/1929 | Murphy | 222—378 |
| 2,709,433 | 5/1955 | Sorenson | 128—218 |
| 2,952,256 | 9/1960 | Meader et al. | 128—221 |
| 3,085,454 | 4/1963 | Federighi | 128—218 |
| 3,216,616 | 3/1964 | Blankenship | 222—386 X |

ROBERT B. REEVES, *Primary Examiner.*

STANLEY H. TOLLBERG, *Examiner.*